UNITED STATES PATENT OFFICE 2,725,411
Patented Nov. 29, 1955

2,725,411

VAPOR PHASE DEHYDROHALOGENATION OF POLYHALOGENOMETHYL COMPOUNDS

Elbert C. Ladd and Merlin P. Harvey, Passaic, and Donald E. Cable and Antoni Szayna, Rutherford, N. J., assignors to United States Rubber Company, New York, N. Y., a corporation of New Jersey No Drawing. Application April 30, 1948,
Serial No. 24,446

9 Claims. (Cl. 260—654)

The invention is a novel vapor phase dehydrohalogenation reaction whereby organic compounds having a polyhalogenomethyl group and an additional halogen atom separated therefrom by an aliphatic chain of only two carbon atoms are converted to polyhalogenoolefinic and/or polyhalogenodiolefinic compounds. More specifically, the invention comprises the vapor phase dehydrohalogenation, and particularly the catalytic vapor phase dehydrohalogenation, of compounds of the type formula $X_2YC$—$CHR$—$CR'R''$—$Z$, where $X$, $Y$ and $Z$ are chlorine and/or bromine, provided that $Z$ is chlorine only when $X$ and $Y$ are chlorine, and $Y$ may alternatively be hydrogen when $Z$ is bromine; $R$, $R'$ and $R''$ being radicals selected from the class of hydrogen, hydrocarbon and substituted hydrocarbon groups.

The starting materials employed in this invention are in the main readily available from the reaction at 25–120° C. of an olefinic compound $RHC{=}CR'R''$ with from 1 to 20 molar equivalents of a polyhalogenomethane, $CX_2YZ$, in the presence of a source of free radicals such as ultraviolet light or a peroxidic compound, e. g., benzoyl peroxide, as illustrated below in (1):

(1)
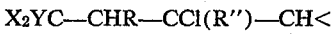

$n$ being an integer, usually from 1 to 5.

Those compounds of the above type formula in which $n{=}1$, i. e., the compounds $X_2YC$—$CHR$—$CR'R''$—$Z$, are the starting materials employed in our invention and they are hereinafter designated as the 1:1 adducts.

Our invention resides in the discovery that these 1:1 adducts, upon being heated in the vapor phase and in the presence or absence of catalysts, undergo dehydrohalogenation to produce a mixture of mono- and diolefinic compounds. This reaction is in marked contrast to that of certain products of reaction (1) wherein $n$ is greater than 1. For example, in U. S. Patent No. 2,410,541, the vapor phase dehydrohalogenation of 1,1,1,5-tetrachloropentane is disclosed as yielding only a mono-olefin, viz., 1,1,5-trichloro-1-pentene, as follows:

(2)
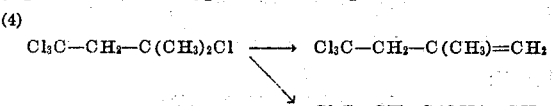

This reaction is effected by passing a vaporized mixture of the 1,1,1,5-tetrachloropentane and a hydroxylic promoter such as water over a heated catalyst bed containing a heteropolyacid or a polyvalent metal halide such as zinc chloride.

To the contrary, we have now found that the 1:1 adduct, 1,1,1,3-tetrachloropropane, can be converted to a mixture of 1,1,3-trichloropropene and the polymerizable diolefin, 1,1-dichloroallene, by simply heating it in the vapor phase at a high temperature such as 300° C., as follows:

(3)    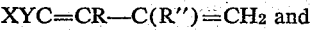
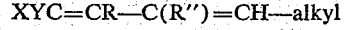

We have found this reaction to be favored by the presence of polyvalent metal oxides and/or halides, in catalytic amounts, but in no case has a hydroxylic promoter, such as these employed by the art, been found necessary. Although it has also been found that these 1:1 adducts will undergo dehydrohalogenation in the liquid phase in the absence of a hydroxylic promoter, the reaction product thus obtained is predominantly the monoolefinic product contaminated by a considerable proportion of polymer.

Moreover, we have made a further discovery in applying our vapor phase reaction conditions to those 1:1 adducts, $X_2YC$—$CHR$—$CR'R''$—$Z$, wherein $R'$ and/or $R''$ are radicals other than hydrogen, and particularly where $R'$ and/or $R''$ are aliphatic hydrocarbon substituents in which the carbon atom at the point of attachment (gamma to the terminal polyhalogenomethyl group) bears at least one hydrogen atom, e. g.

$$X_2YC{-}CHR{-}CCl(R''){-}CH{<}$$

In such cases, the major proportion of the monoolefinic reaction product contains the original —$CX_2Y$ group intact, while the diolefinic product is largely of the conjugated 1,3-dienic type. For example:

(4)
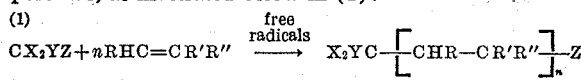

In reaction (4) no detectable quantity of the isomeric monoolefinic product, $Cl_2C{=}CH$—$C(CH_3)_2Cl$, is to be found.

Hence, we have originated a method for the dehydrohalogenation of the 1:1 adducts $$X_2YC{-}CHR{-}CR'R''{-}Z$$

and have likewise discovered certain novel reactions which these adducts undergo to yield a variety of new and useful polyhalogenoolefinic and diolefinic compounds. Two particularly valuable classes of the latter type are those having the general formulae $XYC{=}CR{-}C(R''){=}CH_2$ and
$\qquad\qquad XYC{=}CR{-}C(R''){=}CH$—alkyl Reactions (3) and (4) above illustrate the application of our dehydrohalogenation method to the 1:1 adducts, $X_2YC$—$CHR$—$CR'R''$—$Z$, where $R$, $R'$ and $R''$ are hydrogen or methyl. More broadly, $R$ may be a radical from the class of hydrogen, methyl, phenyl, carboxyl, groups hydrolyzable to carboxyl (such as carbanhydro, carbamyl, carbonitrile, and carbalkoxy, e. g., carbomethoxy), carboxymethyl, and groups hydrolyzable to carboxymethyl (such as carbonitrilomethyl); or $R$ and $R''$ may together comprise an aliphatic chain of three or four carbon atoms (e. g., trimethylene and tetramethylene), or $R'$ and $R''$ can be alkyl (e. g., methyl, ethyl, propyl, isopropyl, butyl, amyl, cyclopentyl, hexyl, cyclohexyl, heptyl, octyl, nonyl and decyl), alkenyl (e. g., 3-butenyl and 4-cyclohexenyl), aryl (e. g., phenyl, tolyl, xylyl, naphthyl, xenyl, p-methoxyphenyl, p-chlorophenyl, o,p-dichlorophenyl, and p-fluorophenyl), aralkyl (e. g., benzyl), hydroxyalkyl (e. g., hydroxymethyl, hydroxybutyl, and hydroxynonyl), haloalkyl (e. g., chloromethyl), alkoxy (e. g., methoxy and ethoxy), alkenoxy (e. g., allyloxy and 2-methylallyloxy), aryloxy (e. g., phenoxy and p-chlorophenoxy), alkoxyalkyl (e. g., methoxymethyl, ethoxymethyl, butoxypropyl and methoxynonyl), aryloxyalkyl (e. g., phenoxymethyl), acyl (e. g., acetyl, propionyl, butyryl, isobutyryl, and benzoyl), acylalkyl (e. g., acetylmethyl and benzoylmethyl), acyloxy (e. g., acetoxy, butyroxy and benzoyloxy), acyloxyalkyl (e. g., acetoxymethyl), and carboxyl and carboxyalkyl and groups hydrolyzable to carboxyl or carboxyalkyl, provided that at least one of R, R' and R" is hydrogen, and that R is hydrogen when R' and R" are hydrogen.

Among the wide variety of 1:1 adducts which can be employed in our invention, those especially preferred in regard to high yield of products, ease of purification thereof, simplicity of reaction conditions and minimalization of undesirable side reactions, are those 1:1 adducts in which R, R' and R" are radicals selected from the class of hydrogen, alkyl, halogen, halogenoalkyl, carbonitrilo and carbonitriloalkyl. Exemplary of such preferred types are the following:

Class A:

$$X_2YC-CH_2-CR'R''-Z$$

where R' and R" are hydrogen, alkyl, haloalkyl or carbonitriloalkyl;

Class B:

$$Cl_3C-CH_2-CHR''-Z$$

where R" is hydrogen, chlorine, alkyl, chloroalkyl or carbonitriloalkyl;

Class C:

$$Cl_3C-CH_2-CR'R''-Cl$$

where R' and R" are hydrogen or alkyl;

Class D:

$$Cl_3C-CH_2-CHR''-Cl$$

where R" is hydrogen, alkyl or chloroalkyl;

Class E:

$$Cl_3C-CH_2-CHR''-Br$$

where R" is hydrogen or alkyl.

The reaction of our invention is carried out by heating the 1:1 adduct in the vapor phase at 150–500° C., or higher, for a time sufficient to effect the desired amount of dehydrohalogenation. A particularly convenient method consists in passing the vapors of the 1:1 adduct through a tubular reaction vessel which is maintained at the desired reaction temperature by external heating. To increase the surface area of contact within the reaction tube, it may be packed with beads, chips, pellets or other coarsely sub-divided fragments of various inert solids such as quartz, glass and pumice.

The efficiency of the reaction can be further enhanced by the presence within the reaction tube of a catalytic quantity of a polyvalent metal halide, particularly an anhydrous chloride of zinc, calcium, cadmium, silver, barium, magnesium, beryllium, iron, manganese, aluminum, nickel, copper, lead, or chromium, or of an oxide or oxychloride of any of said metals or of silicon, vanadium, tungsten, molybdenum or thorium or mixtures of any of said catalysts. Of these, activated alumina, bauxite, silica gel, zinc chloride, molybdenum oxide, ferric oxide and ferric chloride or mixtures thereof are especially preferred. Such catalysts are conveniently employed in the form of small grains, pellets, powders or flakes, and may be deposited on an inert carrier such as pumice or porcelain or on an active catalyst grain such as silica gel and bauxite by impregnating pea-sized particles of pumice or the like with a solution or dispersion of such catalyst and thereafter drying and/or baking. During continuous operation of our dehydrohalogenation process the packing and/or catalyst in the reaction tube gradually accumulates a carbonaceous deposit which tends to lower the conversion of the 1:1 adduct to the unsaturated products. Although this can be offset to some extent by gradually increasing the reaction temperature, it is ultimately necessary to restore the activity of the packing and/or catalyst by passing through it a mixture of air and steam at 300–500° C. whereby any carbonaceous deposits present are removed by controlled combustion. Continuous operation on a commercial scale is insured by operating two or more reaction tubes in parallel so that regeneration of one of the tubes can be effected while the other is "on stream" in the dehydrohalogenation reaction.

The vaporized 1:1 adduct is passed through the heated reaction tube in the presence or absence of inert diluents, e. g., nitrogen and carbon dioxide, and at space velocities in the approximate range of from 0.5 to 3.0 kilograms of the 1:1 adduct per liter of reaction zone or catalyst zone per hour. The reaction is ordinarily carried out at atmospheric pressure, although lower pressures, e. g., 1–600 mm., can be advantageously employed in the case of the higher-boiling 1:1 adducts. The effluent vapors from the reaction tube are collected by condensation in a cooled receiver which preferably contains a polymerization inhibitor such as hydroquinone or p-tert.-butyl catechol to stabilize the monomeric unsaturated products. The reaction mixture, which comprises the monoolefinic product, the diolefinic product and, in some cases, unreacted 1:1 adduct, can then be fractionally distilled to separate and isolate the products. Alternatively, the diolefinic compound can first be removed and the residual mixture of the monoolefinic product with the unreacted 1:1 adduct is then recycled through the reaction tube to increase the yield of the diolefinic compound.

In general, higher space velocities can be accommodated at higher temperatures. The lower space velocities favor the formation of the diolefinic product, while the higher space velocities encourage the formation of relatively greater amounts of the monoolefinic product. The ratio of the latter to the amount of the diolefinic compound will also vary somewhat with the reaction temperature as well as the particular catalyst employed, and it is markedly dependent upon the structure of the 1:1 adduct starting material. Thus, for example, in reaction (3) above, the diolefinic compound, 1,1-dichloroallene, is generally obtained in only minor proportions even at high reaction temperatures, e. g., 450° C., and in the presence of very active catalysts, e. g., zinc chloride or aluminum oxide. However, in reaction (4) above, the diolefinic compound, 1,1-dichloro-3-methyl-1,3-butadiene is obtained in significant amounts even at moderate reaction temperatures, e. g., 250° C., and with moderately active catalysts, e. g., ferric chloride, while in the presence of more active catalysts and/or at more elevated temperatures this diene may become the major reaction product.

The unsaturated compounds obtainable by the method of our invention are particularly useful in the preparation of new halogen-containing addition polymers and interpolymers. Moreover, these compounds likewise serve as intermediates for a variety of organic syntheses including such reactions as halogenation, hydration and alkylation.

The following examples disclose our invention in more detail, parts being by weight:

*Example 1*

The reaction vessel is a 60-cm. length of 2-cm. heat-resistant glass tubing packed with ¼-inch glass helices and equipped with a heating jacket. One hundred and thirty-one grams of vaporized 1,1,1,3-tetrachloropropane are passed through the tube at an average temperature of 450° C. and at a rate of 26.2 gms./hour. The effluent gases are condensed in a water-jacketed receiver and the liquified reaction mixture is then washed with water, dried, and fractionally distilled to yield mainly 1,1,3-trichloropropene (B. 130° C./760 mm., 61–3° C./51 mm.; $n_D^{20}$ 1.4961), together with a small amount of a residual oil which is believed to be polymerized 1,1-dichloroallene, and some low-molecular weight copolymer of 1,1-dichloroallene with 1,1,3-trichloropropene.

*Example 2*

The reaction vessel is a 100.5-cm. length of 2.5-cm. heat-resistant glass tubing, mounted vertically and equipped with a heating-jacket and an internally mounted thermocouple. The catalyst is prepared by impregnating pea-sized pumice with about 20% by weight of ferric chloride in the form of an aqueous solution and thereafter drying by heating initially at 90° C. and finally at about 300° C. The tube is packed to a height of about 50 cm. with 126 g. of the impregnated pumice surmounted by 56.7 g. (10 cm. of tube) of unimpregnated pumice, the latter serving as a vaporizing zone. The exit of the tube is attached to an ice-cooled receiver containing a trace of a p-tertiary-butylcatechol and having a connecting trap containing aqueous sodium hydroxide which neutralizes the hydrogen chloride evolved in the reaction. In the trap, which may be cooled, some more vapors of the product are condensed. The reaction tube is heated to 410–428° C., and 1820 g. of liquid 1,1,1,3-tetrachloropropane are added to the vaporizer zone at the rate of 5.30 ml./minute. The reaction is halted after a total of 236 minutes, and the products which have collected in the receiver and trap are washed with water, dried and fractionally distilled to yield about 740 g. of 1,1,3-trichloropropene and a small amount of a gummy residual product believed to be polymerized 1,1-dichloroallene.

*Example 3*

The same reaction tube as in Example 2 is employed but the catalyst in this case is 11 g. of zinc chloride suspended on 99.5 g. of pea-sized pumice (50 cm. of tube length) and surmounted by a 17.5 cm. column of unimpregnated pumice. The tube is initially heated to 351° C. and gradually advanced to 390° C. as the reaction progresses. A total of 1819 g. (1240 ml.) of liquid 1,1,1,3-tetrachloropropane is added to the reaction tube at an average rate of 3.77 ml./minute, the entire reaction time being about 329 minutes. During this time, the entering 1,1,1,3-tetrachloropropane is continually diluted in the vaporizer zone with a total of 40.9 g. of nitrogen. The reaction products are washed, dried and fractionally distilled to yield, as the main product, 1024 g. of 1,1,3-trichloropropene.

*Example 4*

A total of 1963 g. (1420 ml.) of 1,1,1,3-tetrachlorobutane is added to the reaction tube in the course of 272 minutes at an average rate of 5.22 ml./min. In this case, the reaction tube is a 72-cm. length of 2.5-cm. heat-resistant glass tubing containing 107 g. of pumice granules impregnated with 36.25 g. of ferric chloride. The initial reaction tube temperature of 400° C. is gradually raised to 445° C. as the reaction progresses. The contents of the receiver, which also contains 100 g. of water and 3 g. of p-tert.-butyl catechol as an inhibitor, are washed with water, dried and fractionally distilled to yield 91.5 g. of a trichlorobutene believed to be 1,1,1-trichloro-2-butene or 4,4,4-trichloro-1-butene (B. 79.8–80.3° C./103 mm., 61.2–61.8° C./40 mm.; $n_D^{20}$ 1.4830, sp. g. (20°/4°) 1.2851); per cent chlorine, 67.14 (theory, 66.71); and 382.3 g. of the new compound, 1,1-dichloro-1,3-butadiene, B. 46.4–46.7° C./99 mm.; $n_D^{20}$ 1.5028; sp. g. (20°/20°) 1.1697.

*Example 5*

In the course of 116 minutes, seven hundred and eighty-four grams (565 ml.) of 1,1,1,3-tetrachlorobutane are passed into the reaction tube of Example 2, in 50 cm. of which are contained 200 g. of granular activated alumina (6–10 mesh size), surmounted by 35 g. (17.5 cm. of tube) of unimpregnated pumice. A total of 88.5 g. of nitrogen is likewise passed through the tube during the course of the reaction. The initial reaction temperature of 280° C. is gradually raised to 382° C. as the reaction progresses. The reaction products are isolated and purified as in preceding examples to yield 227 g. of 1,1-dichloro-1,3-butadiene, and 47.1 g. of the trichlorobutene obtained in Example 4, and some unreacted starting material.

*Example 6*

To the reaction tube (employed in Example 2) containing pumice impregnated with ferric chloride, as in Example 2, are added 2104 g. (1570 ml.) of 1,1,1,3-tetrachloro-3-methylbutane in the course of 278 minutes, the average rate of addition being 5.65 ml./min. The initial reaction temperature of 359° C. is gradually advanced to 386° C. as the reaction proceeds.

The contents of the receiver, which also contains p-tert.-butyl catechol as an inhibitor, are washed with water, dried and fractionally distilled to yield 725 g. of 4,4,4-trichloro-2-methyl-1-butene (B. 89.5–89.9° C./103 mm.; $n_D^{20}$ 1.4747), and 234 g. of the new compound 1,1-dichloro-3-methyl-1,3-butadiene, B. 47–48° C./40 mm.; $n_D^{20}$ 1.5014; sp. g. 20/20 1.674; per cent chlorine, 51.44 (theory 51.76).

*Example 7*

(a) Example 6 is repeated, using pumice impregnated with zinc chloride. Twelve hundred and sixty g. (947 ml.) of 1,1,1,3-trichloro-3-methylbutane are added to the reaction tube at an average rate of 4.32 ml./min., the temperature of the tube being gradually advanced from 230° C. to 280° C. Distillation of the reaction products yields 340 g. of 4,4,4-trichloro-2-methyl-1-butene and 322 g. of 1,1-dichloro-3-methyl-1,3-butadiene.

(b) Repetition of Example 6 with various catalysts indicates the following approximate order of decreasing effectiveness at 350° C.: activated alumina (8–10 mesh), silica gel (6–16 mesh), zinc chloride, chromic oxide, ferric chloride, ferric oxychloride mixture, magnesium chloride, nickel chloride, cupric chloride, tungstic acid, stannic oxide, plumbous chloride, chromous chloride, cadmium chloride, zirconium oxynitrate, silver chloride, manganous chloride, unimpregnated pumice, phosphotungstic acid, barium chloride, and glass chips or beads. All the catalysts except alumina and silica gel were deposited in amounts of approximately 10 weight percent on granulated pumice.

*Example 8*

A mixture of 1893 g. of 1,1,1,3-tetrachloro-3-methylbutane and 1044 g. of 4,4,4-trichloro-2-methyl-1-butene is passed through the reaction tube of Example 2 containing pumice impregnated with ferric chloride in the course of 405 minutes (av. rate of about 5.5 ml./min.), during which time the reaction temperature is gradually raised from 344° C. to 403° C. The products, which are collected in an ice-cooled receiver containing 100 g. of water and 1 g. of p-tert.-butyl catechlo, are washed with water, dried and then fractionally distilled to yield 1579 g. of 4,4,4-trichloro-2-methyl-1-butene and 270.8 g. of 1,1-dichloro-3-methyl-1,3-butadiene.

*Example 9*

To the reaction tube of Example 2 packed (50 cm. height) with 109.8 g. of pea-sized granules of pumice impregnated with 12.2 g. of zinc chloride and then with 44 g. (20 cm. height) of unimpregnated pumice in the vaporizer zone, 1371 g. (795 ml.) of 3-bromo-1,1,1,4-tetrachlorobutane are added in the course of 204 minutes. The average rate of addition is 3.9 ml./min. and the temperature of the tube is gradually advanced from 268° to 328° C. during the course of the reaction.

The reaction products are isolated and purified in the manner of previous examples to yield (a) 471 g. of the new compound 3-bromo-1,1-dichloro-1,3-butadiene, B. 38–38.9° C./2.3 mm.; $n_D^{20}$ 1.5755; per cent carbon, 23.81 (theory 23.79), per cent hydrogen, 1.73 (theory, 1.50), per cent chlorine, 34.88 (theory, 35.13), per cent bromine, 39.30 (theory, 39.58); and (b) 359.8 g. of the new compound, 1,1,4-trichloro-1,3-butadiene, B. 40–41.5° C./9 mm., 70.0–71.6° C./40 mm.; $n_D^{20}$ 1.5474; per cent carbon, 30.32 (theory, 30.52), per cent hydrogen, 1.90 (theory, 1.92); per cent chlorine, 67.25 (theory, 67.55). Approximately 10.3 g. of a new tetrachlorobutene, believed to be 1,1,1,4-tetrachloro-2-butane, are also obtained, B. 80–81° C./19 mm.; $n_D^{20}$ 1.5152.

Having thus described our invention, what we claim and desire to protect by Letters Patent is:

1. A method of preparing polyhalogenoolefinic compounds which comprises pyrolyzing in the vapor state, in the presence of a dehydrohalogenation catalyst selected from the class consisting of polyvalent metal oxides, and halide catalysts, a 1,1,1-trichloro-3-halogeno alkane having from 3 to 5 carbon atoms, said vapor phase pyrolysis being carried out at a temperature in the range of from 150 to 500° C., and causing thereby the formation of a mixture of monoolefinic trihaloalkene and diolefinic 1,1-dihalodiene chemicals, each having the same number of carbon atoms as the original alkane, the trihaloalkene having a terminal carbon atom linked to from two to three halo atoms.

2. A method of preparing polyhalogenoolefinic compounds which comprises pyrolyzing in the vapor state, a 1,1,1-trichloro-3-halogeno alkane having from 3 to 5 carbon atoms, said vapor phase pyrolysis being carried out at a temperature in the range of from 150 to 500° C. with dehydrohalogenation of said compound and causing thereby the formation of a mixture of monoolefinic trihaloalkene and diolefinic 1,1-dihalodiene chemicals, each having the same number of carbon atoms as the original alkane, the trihaloalkene having a terminal carbon atom linked to from two to three halo atoms.

3. A method of preparing polyhalogenoolefinic compounds which comprises pyrolyzing in the vapor state, in the presence of a dehydrohalogenation catalyst selected from the class consisting of polyvalent metal oxides, and halide catalysts, a 1,1,1-trichloro-3-halogeno alkane having from 3 to 5 carbon atoms, the vaporized compound being passed through the reaction zone at a space velocity in the approximate range of from 0.5 to 3.0 kilograms of vaporized compound per liter of reaction zone, per hour, and said vapor phase pyrolysis being carried out at a temperature in the range of from 150 to 500° C., and causing thereby the formation of a mixture of monoolefinic trihaloalkene and diolefinic 1,1-dihalodiene chemicals, each having the same number of carbon atoms as the original alkane, the trihaloalkene having a terminal carbon atom linked to from two to three halo atoms.

4. A method of preparing polyhalogenoolefinic compounds which comprises pyrolyzing in the vapor state, a 1,1,1-trichloro-2-halogeno alkane having from 3 to 5 carbon atoms, the vaporized compound being passed through the reaction zone at a space velocity in the approximate range of from 0.5 to 3.0 kilograms of vaporized compound per liter of reaction zone, per hour, and said vapor phase pyrolysis being carried out at a temperature in the range of from 150 to 500° C. with dehydrohalogenation of said compound and causing thereby the formation of a mixture of monoolefinic trihaloalkene and diolefinic 1,1-dihalodiene chemicals, each having the same number of carbon atoms as the original alkane, the trihaloalkene having a terminal carbon atom linked to from two to three halo atoms.

5. A method which comprises pyrolyzing in the vapor state a chemical of the formula

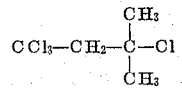

said vapor phase pyrolysis being carried out in the presence of a dehydrohalogenation catalyst selected from the class consisting of polyvalent metal oxides, and halide catalysts, and at a temperature in the range of from 150 to 500° C., and forming a chemical of the formula

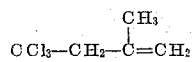

6. A process of preparing 1,1-dichlorobutadiene-1,3 which comprises heating 1,1,1,3-tetrachlorobutane in the vapor state in the presence of a dehydrochlorination catalyst selected from the class consisting of polyvalent metal oxides, and halide catalysts, at a temperature in the range of from 150 to 500° C. and for a time sufficient to effect dehydrochlorination of said butane.

7. A 1,1-dihalogeno-1,3-alkadiene of the formula

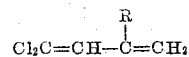

R being selected from the class consisting of hydrogen and methyl.

8. 1,1-dichloro-3-methyl-1,3-butadiene.

9. 1,1-dichlorobutadiene-1,3.

References Cited in the file of this patent

UNITED STATES PATENTS

| 1,965,369 | Carothers et al. | July 3, 1934 |
| 2,252,536 | Wiley | Aug. 12, 1941 |
| 2,410,541 | Joyce | Nov. 5, 1946 |
| 2,524,383 | Hearne et al. | Oct. 3, 1950 |

FOREIGN PATENTS

| 418,469 | Great Britain | Oct. 25, 1934 |
| 215,655 | Switzerland | Oct. 1, 1941 |
| 581,901 | Great Britain | Oct. 29, 1946 |

OTHER REFERENCES

Huntress: "Organic Chlorine Compounds," pages 648, 972.5.